May 19, 1931. A. B. RAMSPERGER 1,805,674
STAND
Filed Oct. 22, 1927
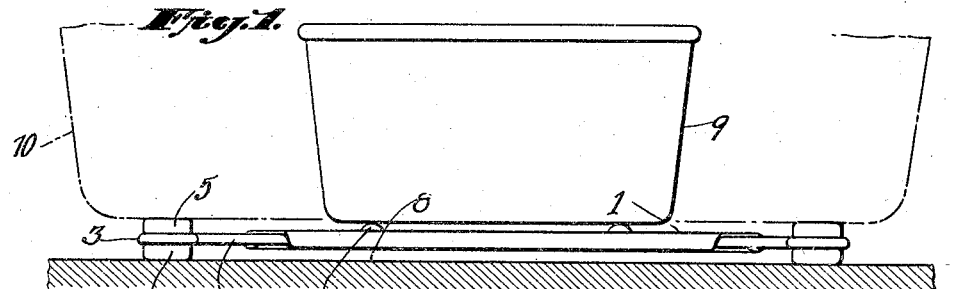
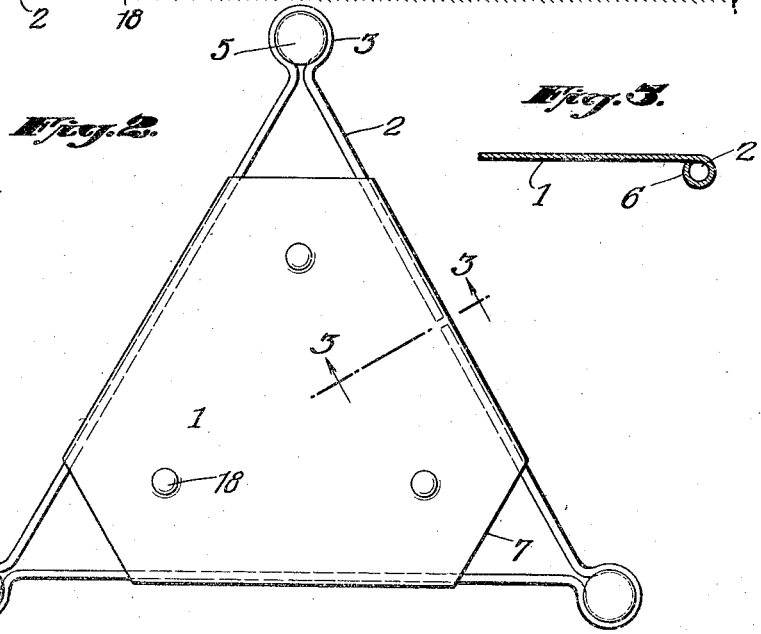
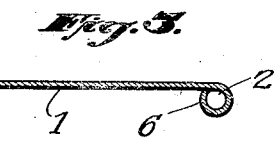
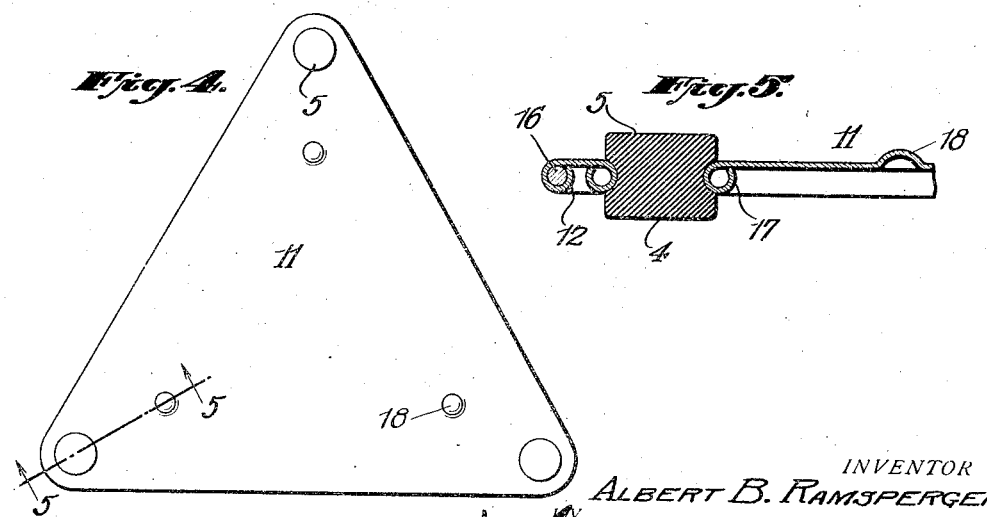
INVENTOR
ALBERT B. RAMSPERGER.
ATTORNEY Patented May 19, 1931

1,805,674

UNITED STATES PATENT OFFICE

ALBERT B. RAMSPERGER, OF RICHMOND HILL, NEW YORK

STAND

Application filed October 22, 1927. Serial No. 227,962.

My invention aims to provide a stand adapted for a variety of uses; such, for example, as the supporting of cooking utensils in an enameled or porcelain sink to prevent the soiling or scratching of the latter; the supporting of dishes on tables to prevent burning or scratching the latter; the supporting of a loud speaker on a radio cabinet to prevent transmission of vibrations to the receiver; the supporting of the receiver of a radio equipment to prevent transmission to the radio tubes of vibrations of the floor, table or stand, and so forth.

My improved stand is a very simple and cheap construction and has other advantages referred to in detail hereinafter.

The accompanying drawings illustrate embodiments of the invention.

Fig. 1 is a side elevation of the stand in use;

Fig. 2 is a plan;

Fig. 3 is a section on the line 3—3 of Fig. 2;

Fig. 4 is a plan of an alternative construction;

Fig. 5 is a section on the line 5—5 of Fig. 4.

Referring to Figs. 1 and 2, the central portion of the stand consists of a plate 1 and is supported at its edges by a wire 2 which is bent to form loops 3 at the corners. In these loops are fastened legs 4 which extend through the loops and upward to form projections 5. The wire is a continuous length with its ends abutting as shown in dotted lines in Fig. 2. The edges of the plate 1 are crimped around the middle portions of the wire between the corners as shown at 6, Fig. 3. This stiffens the plate and fastens it firmly to the wire and also holds the wire firmly in shape; the crimped edges of the plate extending nearly to the corners of the stand and the corners of the plate being cut off as at 7.

The legs 4 support the stand on the structure 8, Fig. 1, which is to be protected, such as the bottom of an enamel sink, for example. The plate 1 is provided with projections 18 formed by punching up the metal and serving as points upon which a small vessel 9 can rest directly. This arrangement saves the flat surface of the plate to some extent and is particularly useful in cases where advertising or other embossing is provided in the centre of the plate. The projections 18 save such embossing from wear and excessive accumulation of dirt.

Where larger vessels are involved, such as indicated in dotted lines 10, they may rest on the upward projections 5 so as to make contact at a few isolated points instead of over the entire stand.

For this purpose the projections may be separate from the legs 4 and may be variously located, though it is a matter of simplification to make the legs and the projections in one piece. They are preferably of rubber forced into place so as to be pinched by the wire loops,—the rubber being less liable to slip than most other materials, or they may be made of cork, wood or other cushioning material, the wire loops 3 being crimped around them if necessary to hold them fast.

When any weight is applied to the plate or to the projections 18 or 5, the legs 4 are compressed and laterally expanded and thus bound in the wire loops even more securely than when there is no weight applied.

The plate 1 may be made of various materials, such as aluminum or other non-rusting metal or plated or enamled metal, and the same is true of the wire 2. Preferably, however, both the wire and the plate are enameled.

Also the shape and the number of legs may be varied though I prefer the triangular shape shown. It has an advantage in that the plates can be cut with economy of material and the stand is more stable than where more than three legs are used. In use the stand is apt to be bent in which case if there were more than three legs they might not all come to an even bearing. With three legs the stand will assume a firm bearing even though it is somewhat bent out of shape.

The ends of the wire may be welded or joined by a sleeve or other coupling device. But the crimping of the plate will hold them against lateral movement and the rigidity of the other two sides of the triangle will prevent any substantial tendency to pull the ends apart, so that ordinarily no joining of the ends is necessary.

A simplified construction is shown in Figs. 4 and 5. Here the plate 11 extends clear to the corners of the stand. Its edges are crimped as at 12, Fig. 5, and reinforced with a wire 16. The wire may be omitted, the bead formed by the sheet metal serving as a sufficient stiffener, and this bead may be any sort of flanged design. Preferably an ordinary round bead is used to give smoothness and ease of handling. The corner posts 4, 5 are passed through holes made directly in the plate 11, the edges of which are crimped around as at 17 to tightly engage the legs.

Various modifications may be made by those skilled in the art without departing from the invention as defined in the following claim.

What I claim is:

A stand of the character described comprising a metal plate and a wire to which the edges of the plate are fastened and which has loops and legs fastened in said loops of wire.

In witness whereof, I have hereunto signed my name.

ALBERT B. RAMSPERGER.